Nov. 16, 1943.   B. CASTIGLIA   2,334,606
CENTERING CONES
Filed Oct. 24, 1939
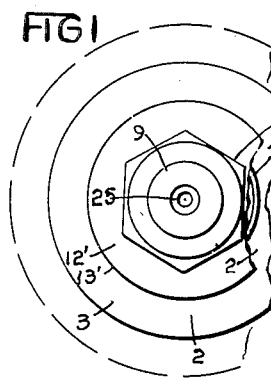
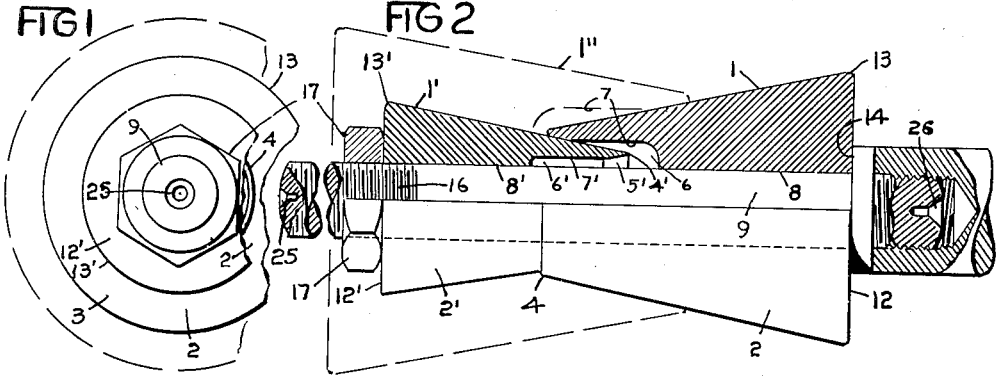
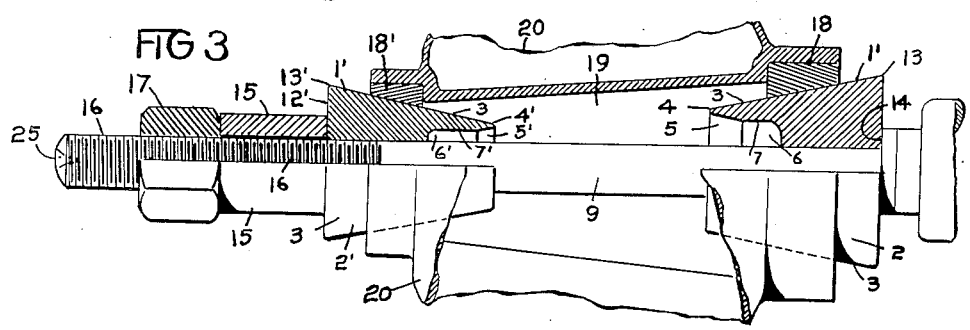
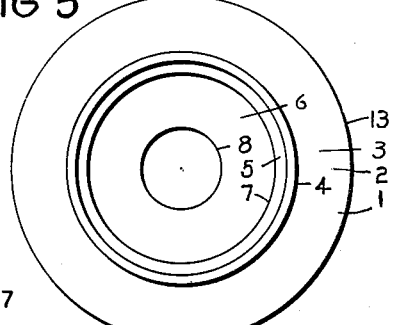
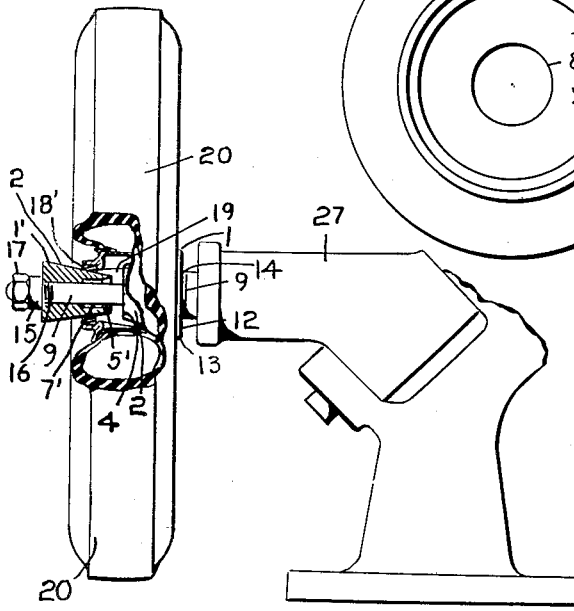
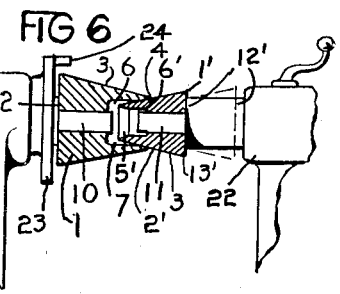
INVENTOR.
BIAGIS CASTIGLIA.
BY Paul A. Talbot.
ATTORNEY.

Patented Nov. 16, 1943

2,334,606

UNITED STATES PATENT OFFICE 2,334,606

CENTERING CONE

Biagis Castiglia, New York, N. Y.

Application October 24, 1939, Serial No. 300,948

1 Claim. (Cl. 144—238)

My invention relates to an improvement in a mandrel and cones for centering wheels and other objects by their internal bore or bearings and has among its purposes and objects to provide:

Centering cones in pairs in whch the small end of one of the cones may enter the small end of the other.

A means of using a reduced number of cones having a given taper to suit a greater number of internal diameters of objects being centered.

Cones which, because of a taper of much less than 45 degrees, engage the bore or bearings of the object being centered and thus are not affected or are less affected by the faces at the end of the bore of such objects.

A better means of centering objects.

A more convenient centering cone.

A more convenient set of centering cones.

A means of more accurately centering objects.

I accomplish these and other objects by the construction set forth in the following specification and in the accompanying drawing forming a part hereof in which:

Fig. 1 is an end elevation.

Fig. 2 is a half section and side elevation.

Fig. 3 is a half section and side elevation.

Fig. 4 is an elevation showing an application of my device.

Fig. 5 is an end elevation of the small end of a cone.

Fig. 6 is a section and elevation of a modification of the adjusting means.

Similar reference characters refer to similar parts throughout the several views of the drawing and in the specification to follow.

Cones for centering various objects have been used for many purposes and the angle of taper of the external surfaces of such cones has varied to suit the requirements.

In general, the cones having the greatest taper as contrasted to cylindrical sleeves or mandrels have the greatest range of utility in suiting a wider range of sizes of bores of objects being centered. Expanding mandrel devices have been used to reduce the number required to suit the varying internal bores of objects being centered.

My invention particularly relates to pairs of cones in which one cone is used to center one end of a bore and the other of the pair is used to center the other end of the bore of an object being centered, the bore of both cones fitting closely the mandrel on which they are mounted. Both cones are forced into accurate engagement with the respective ends of the bore of the object being centered by a thread, nut, and shoulder on the mandrel on which the cones are mounted.

My pair of cones, however, may be forced toward each other and into engagement with the respective ends of the bore of the object being centered by other means than a single mandrel, one of such means being illustrated in Fig. 6 of the drawing.

Centering cones are sold in sets having a large number of cones suited to a common mandrel. Such cones are preferably provided with a taper suited to the taper common to the outer roller races of tapered roller bearings. The taper of such cones is about 20 to 30 degrees (10 to 15 degrees) from the axial centerline.

Such sets of cones, because of the small taper used, often meet at their small ends before engaging the bore of the object being centered and thus cannot serve to center all objects for which such a set should be adapted.

My cones are constructed with a bored out small end so that the small end of the smaller of a pair of cones may enter the small end of the larger cone of the pair of cones being used for a certain bore of an object being centered. My cones so constructed may be greatly reduced in number and overcome the difficulty of abutting or engaging each other before engaging the bore of the object being centered.

Referring to the drawing, the construction of the preferred type of my cones may be readily understood by those skilled in the art to which my invention pertains. The taper and length of the center bore may vary and the means of forcing the cones toward each other on a mandrel or centers may be also modified to suit the various uses to which my invention is adapted. For the purpose of illustration and clarity, I have herein described in detail one of the constructions which embody the principles underlying my invention.

While I have shown my centering cones adapted to a wheel balancing machine, the operation of which may be better understood by referring to a conjointly pending patent application filed June 30, 1939, having a Serial Number 282,049 for a Dynamic and static wheel balancer, it is obvious that the centering of various objects for other purposes than balancing may be accomplished by their use.

One of the cones 1 is preferably finished on its exterior surface 2 to a taper 3 which may vary from 20 degrees to 80 degrees or from 10 degrees to 40 degrees as regards an axial centerline. I have shown the taper conforming to the standard taper roller bearing used in many vehicle wheels particularly for cars and trucks. Each cone is preferably longer than the diameter of its larger end.

The small end 4 of each cone is preferably counterbored at 5 and 5' respectively for a part of its length to add strength and to receive the small end 4' of the smaller companion cone 1'. Both the exterior surfaces of the cones 1 and 1' and the counterbores 5 and 5' of the cones are provided with the same taper. Clearance spaces 6 and 6' in the bores 7 and 7' in the cones are provided beyond the counterbore. The counterbores and bore for clearance are of a combined length of less than one half the length of the cone and the center bores 8 and 8' on which the cones are centered on the mandrel 9 or centers 10 and 11 are thus more than one half of the length of the cones.

The faced ends 12 and 12' at the large ends 13 and 13' engage the shoulder 14 and distance piece 15 of the mandrel 9 which is threaded at 16 to receive the nut 17 which when tightened causes the cones 1 and 1' to be forced toward each other thereby engaging the outer races 18 and 18' of the bearings or the bore 19 of the wheel or other object 20 to be centered.

The center 10, such as used in a lathe head stock 21 and the center 11 such as suited to the tail stock 22 of a lathe may be of a diameter equal to the diameter of the mandrel and the center bores of the cones as shown in Fig. 6 of the drawing.

The object 20 may be revolved by the face plate 23 and stud 24 in the usual manner.

The mandrel 9 may be also used in a lathe between its pointed centers, not shown which may engage the centers 25 and 26 in the usual way when turning shafts, spindles, etc.

The mandrel is shown as secured to and suited to be revolved by a balancing machine 27 in Fig. 4 of the drawing.

In Fig. 2, I have shown two cones in full lines nested close together and a third cone is shown in broken lines to show that more cones than a pair of cones may be combined to suit a wide variety of internal bores. Sets of cones may thus be provided and so proportioned that the small end of a smaller cone may enter the small end of a larger cone. Each of the cones of a set of more than one pair of cones is provided with a center bore having a diameter suitable to receive the same mandrel as the smallest cone of the set, and several sets, each set having cones which may be assembled on a mandrel to suit, may be standardized to suit all ordinary sizes of wheels or other objects which are to be centered.

Having thus described and shown in detail one of numerous constructions embodied in and underlying my invention, I may wish to depart therefrom to suit the uses to which my invention is adapted within the scope of the claim which sets forth my invention.

I claim:

In wheel centering cones, a pair of cones, one of said cones being larger than the other, each of said cones having a length greater than the diameter of its largest end, the small end of the larger cone of the pair provided with a counterbore having a taper substantially equal to the taper of the exterior surface of the smaller cone, the diameter of an intermediate transverse section of said smaller cone, whereby the counterbore of said larger cone will telescope over the small end of the smaller cone and the overall length of the two cones may be varied to center wheels varying in length of bore, each of said cones having an axial bore of a diameter smaller than the diameter of the small end of the smaller cone, supporting means comprising a mandrel engaging said axial bores and means on said mandrel to draw said cones toward each other, whereby a wheel may be held and centered on said supporting means.

BIAGIS CASTIGLIA.